US007145948B2

United States Patent
Ye et al.

(10) Patent No.: US 7,145,948 B2
(45) Date of Patent: Dec. 5, 2006

(54) ENTROPY CONSTRAINED SCALAR QUANTIZER FOR A LAPLACE-MARKOV SOURCE

(75) Inventors: Jong Chul Ye, Croton-on-Hudson, NY (US); Yingwei Chen, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 684 days.

(21) Appl. No.: 10/157,662

(22) Filed: May 29, 2002

(65) Prior Publication Data

US 2003/0223493 A1  Dec. 4, 2003

(51) Int. Cl.
*H04B 7/18* (2006.01)

(52) U.S. Cl. ............ 375/240.03; 375/240.05; 375/240.08

(58) Field of Classification Search ........ 375/240.02–240.08; 382/230–255
See application file for complete search history.

(56) References Cited

U.S. PATENT DOCUMENTS 6,731,811 B1 *  5/2004  Rose .................. 382/238

OTHER PUBLICATIONS

On the structure of optimal entropy-constrained scalar quantizers Gyorgy, A.; Linder, T.; IEEE Transactions on , vol.: 4 , Issue: 2, Feb. 2002 pp.: 416-427.*
Optimal entropy constrained scalar quantization for exponential and Laplacian random variables Sullivan, G.J.;Acoustics, Speech, and Signal Processing, 1994. ICASSP-94., 1994 IEEE International Conference on , vol. v, Apr. 19-22, 1994 p. 265-268.*
"Toward Optimality in Scalable Predictive Coding", by Rose et al, IEEE Transactions on Image Processing, vol. 10, No. 7, Jul. 2001, pp. 965-976.
"Efficient Scalar Quantization of Exponential and Laplacian Random Variables" by Sullivan, IEEE Transactions on Information Theory, vol. 42, No. 5, Sep. 1996, pp. 1365-1374.
K. Rose et al; "Toward Optimality in Scalable Predictive Coding", IEEE Transactions on Image Processing, vol. 10, No. 7, Jul. 200L.
G. Sullivan, "Efficient Scalar Quantization of Exponential and Laplacian Random Variables", IEEE Transactions on Information Theory, vol. 42, No. 5, Sep. 1996.

* cited by examiner

*Primary Examiner*—Anand Rao

(57) ABSTRACT

A video coding system and method for coding an input frame in which the evolution of discrete cosine transform (DCT) coefficients is modeled as a Laplace-Markov process, the system comprising: a base layer processing system for generating a base layer reconstruction; an enhancement layer processing system for generating an enhancement layer reconstruction; and an entropy constrained scalar quantizer (ECSQ) system for descritizing a prediction residual between the input frame and an estimation theoretic (ET) prediction output; wherein the ECSQ system utilizes an ECSQ that comprises a uniform threshold quantizer with a deadzone size defined by the equation:

$$\Gamma(\alpha, t^*) = 2\left(\frac{1}{1-\rho^2}e^{t^*} - 1\right), \text{ where}$$

$$\Gamma(\alpha, \beta) = (e^\alpha - 1)\exp\left\{-\alpha\left[\frac{d(\alpha - \delta(\alpha)) - d(-\beta)}{d(\alpha - \delta(\alpha)) - d(-\delta(\alpha))}\right]\right\}.$$

13 Claims, 2 Drawing Sheets

ENTROPY CONSTRAINED SCALAR QUANTIZER FOR A LAPLACE-MARKOV SOURCE

BACKGROUND OF THE INVENTION

1. Technical Field

The present invention relates generally to scalable video coders, and more specifically to a system and method that incorporates an optimal design for an entropy constrained scalar quantizer (ECSQ) for a Laplace-Markov source model.

2. Related Art

As the popularity of systems utilizing compressed video and data signals continues to grow, improving compression performance remains an ongoing challenge. Various compression standards, including MPEG-4 (Moving Picture Expert Group) and H.263 video compression, provide for various mechanisms, including base layer and enhancement layer coding, to improve compression efficiency.

One particular challenge involves applications requiring a scalable bitstream, which have become a common requirement for many coding and transmission systems. Many applications, including multiparty video conferencing and multicast over the Internet, require the compressed information to be simultaneously transmitted to multiple receivers over different communication links. A scalable bitstream is one that allows decoding at a variety of bit rates (and corresponding levels of quality), where the lower rate information streams are embedded within the higher rate bitstreams in a manner that minimizes redundancy. Unfortunately, the scalability necessary to implement such a system usually has a negative impact on the overall compression efficiency.

Recently, a new efficient scalable video coding algorithm has been proposed in which the coding efficiency can be increased using an estimation theoretic approach. This approach consistently outperforms the existing signal-to-noise ratio (SNR) scalable video coders for all rates. In this algorithm, the evolution of the discrete coefficient transform (DCT) coefficients is modeled as a Laplace-Markov process, and can be implemented in a state-of-the-art encoder that optimally combines the quantizer information of both the base layer and the enhancement layer. Unlike a conventional scalable video coder, the state-of-the-art coder uses information from the base layer and enhancement layer DCT coefficients to optimally predict and reconstruct in an estimation theoretic (ET) framework. Greater control over the quantizer information results in potentially better performance since the quantizer information affects both the distortion and the bitrate of the system. Such a methodology is described in "Toward Optimality in Scalable Predictive Coding," by Kenneth Rose and Shankar L. Regunathan, *IEEE Trans. on Image Processing*, vol. 10, no. 7, 965, July 2001, which is hereby incorporated by reference.

While such recent state-of-the art coders using the above-mentioned algorithms have clearly demonstrated advantages over prior art scalable video coders, they have failed to address the quantizer design. Rather such systems presently utilize a conventional uniform threshold quantizer (UTQ) with a "deadzone." (See, e.g., G. Sullivan, "Efficient scalar quantization of exponential and Laplacian random variables," *IEEE Trans.on Information Theory*, vol. 42, no. 5, pp. 1365–1374, September 1996, which is hereby incorporated by reference.)

Since this type of quantizer has not been designed for a Laplace-Markov source model, a loss of coding efficiency may result. Accordingly, without an optimal quantizer design, coders employing a Laplace-Markov source model will fail to provide the best possible performance.

SUMMARY OF THE INVENTION

The invention addresses the above-mentioned problems, as well as others, by providing an improved encoder that incorporates an explicit formula derived to compute the optimal entropy-constrained scalar quantizer (ECSQ), which is tailored to the Laplace-Markov model of DCT coefficients.

In a first aspect, the present invention provides a scalable video coding system in which the evolution of discrete cosine transform (DCT) coefficients is modeled as a Laplace-Markov process, the system comprising: a base layer processing system for generating a base layer reconstruction; an enhancement layer processing system for generating an enhancement layer reconstruction; and an entropy constrained scalar quantizer (ECSQ) system derived from an explicit formula tailored to the Laplace-Markov model of DCT coefficients.

In particular, the scalable video coding system utilizes an ECSQ that comprises a uniform threshold quantizer with a deadzone size defined by the equation:

$$\Gamma(\alpha, t^*) = 2\left(\frac{1}{1-\rho^2}e^{t^*} - 1\right),$$

where $t^*$ denotes the optimal deadzone size; $\rho$ is a value between $-1$ and $1$, and $\alpha$ is a step size, and where $$\Gamma(\alpha, \beta) = (e^\alpha - 1)\exp\left\{-\alpha\left[\frac{d(\alpha - \delta(\alpha)) - d(-\beta)}{d(\alpha - \delta(\alpha)) - d(-\delta(\alpha))}\right]\right\}.$$

In a second aspect, the invention provides a program product stored on a recordable medium for use in a scalable encoder in which the evolution of discrete cosine transform (DCT) coefficients is modeled as a Laplace-Markov process, the program product comprising: means for generating a base layer reconstruction; means for generating an enhancement layer reconstruction; and quantizer means derived from an explicit formula tailored to the Laplace-Markov model of DCT coefficients.

In a third aspect, the invention provides a scalable encoding method in which the evolution of discrete cosine transform (DCT) coefficients is modeled as a Laplace-Markov process, the method comprising: generating a base layer reconstruction; generating an enhancement layer reconstruction; and descritizing a prediction residual between an input frame and an estimation theoretic (ET) prediction output with an entropy constrained scalar quantizer (ECSQ) derived from an explicit formula tailored to the Laplace-Markov model of DCT coefficients.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

1. System Overview

The present invention provides an optimal entropy-constrained scalar quantizer (ECSQ) that is derived from an explicit formula tailored to the Laplace-Markov model of DCT coefficients. The optimal ECSQ can be readily incorporated into a state-of-the-art coder to provide a more efficient system for compressing scalable video. For the purposes of this exemplary embodiment, a "state-of-the-art coder" is one that uses information from the base layer and enhancement layer DCT coefficients to optimally predict and reconstruct in an estimation theoretic (ET) framework. As will be shown below, the optimal ECSQ in accordance with this exemplary embodiment comprises a simple UTQ with a larger deadzone size.

Figure 1:
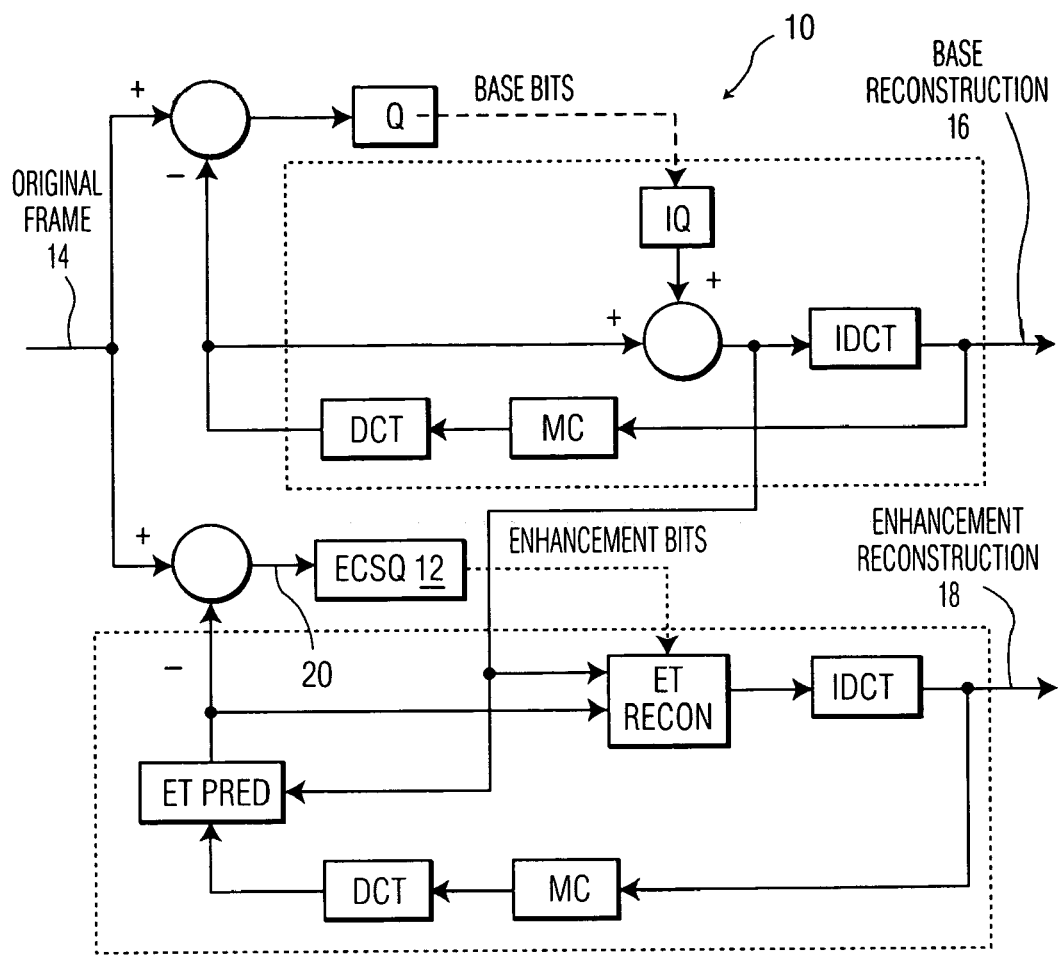
FIG. 1 depicts a state-of-the-art scalable video coder that includes an optimal entropy-constrained scalar quantizer (ECSQ) in accordance with the present invention.

Referring first to FIG. 1, an improved state-of-the-art scalable video coder 10 of the present invention is shown, which replaces a simple quantizer block with an ECSQ block 12. Coder 12 receives as input an original frame 14, and outputs a base reconstruction 16, and an enhancement reconstruction 18. As noted above, the state-of-the-art scalable video coder 10 uses information from the base layer and enhancement layer DCT coefficients to optimally predict and reconstruct in an estimation theoretic (ET) framework. By incorporating ECSQ block 12, which utilizes an optimal ECSQ to descritize the prediction residual 20, coder 10 provides a more efficient system for compressing scalable video.

2. ECSQ Derivation

In a state-of-the-art scalable video coder, the evolution of a DCT coefficient in time ("from frame to frame") is modeled by the first-order Markov process:

$$x_{i,n} = \rho x_{i,n-1} + z_{i,n}, \quad (1)$$

where $x_{i,n}$ is the DCT coefficient in frame n and $x_{i,n-1}$ is the DCT coefficient in the previous frame that was mapped to it by motion compensation, $z_{i,n}$ denotes an independent innovation generating process and $\rho$ is the AR coefficient having an absolute value less than 1. Furthermore, if the DCT coefficients $x_{i,n}$ and $x_{i,n-1}$ are assumed to be Laplacian with a variance of $2\mu^2$, the density of innovation process $z_{i,n}$ is given by:

$$p(z) = \rho^2 \delta(z) + \frac{(1-\rho^2)}{2} \frac{1}{\mu} \exp\{-|z|/\mu\} \quad (2)$$

Suppose we have $\tilde{x}_{i,n-1}$ (an estimate of $x_{i,n-1}$), then the residual signal at the encoder is given by:

$$r_{i,n} = x_{i,n} - \rho \tilde{x}_{i,n} = \rho(x_{i,n-1} - \tilde{x}_{i,n-1}) + z_{i,n} \quad (3)$$

Hence, the probability density function of the residual signal $r_{i,n}$ is again given by equation (2), shifted by amount of $\rho(x_{i,n-1} - \tilde{x}_{i,n-1})$.

Now, the encoder quantizes the residual $r_{i,n}$ in equation (3) and transmits its index. In a high bit rate case, $x_{i,n-1} - \tilde{x}_{i,n-1} \cong 0$, hence residual $r_{i,n}$ converges to $z_{i,n}$ in distribution.

Therefore, in order to provide the best video quality under a rate-constraint, a quantizer should be designed to match the distribution of equation (2), referred to herein as the "entropy-constrained scalar quantizer" (ECSQ).

Figure 2:
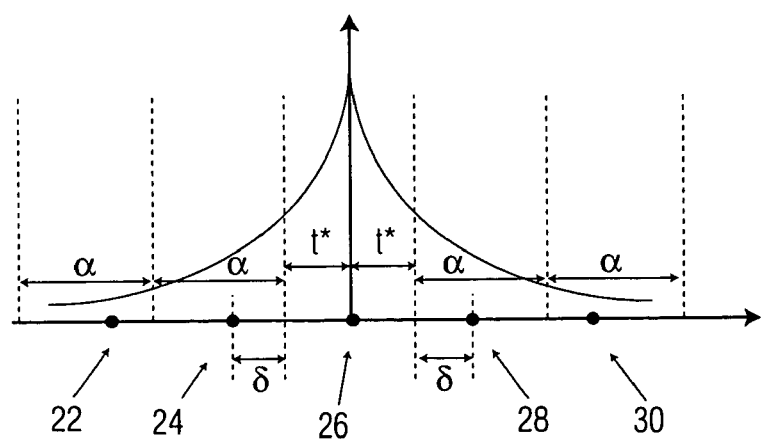
FIG. 2 depicts an ECSQ for a Laplace source.

The optimal ECSQ has been extensively investigated for a Laplace source. It has been shown that the optimal ECSQ with infinite level is the uniform threshold quantizer (UTQ) with deadzone as shown in FIG. 2. As can be seen in FIG. 2, the continuous source is partitioned into multiple regions comprising a series of steps having a size of $\alpha$, and a deadzone or zero bin having a size of t*. Samples in each interval are quantized to a point 22, 24, 26, 28, 30. The deadzone, shown as t*, defines the portion of the curve that is quantized to zero.

The optimal deadzone size t* can be computed from the following formula:

$$\Gamma(\alpha, t^*) = 2(e^{t^*} - 1) \quad (4)$$

where:

$$\Gamma(\alpha, \beta) = (e^\alpha - 1) \exp\left\{-\alpha \left[\frac{d(\alpha - \delta(\alpha)) - d(-\beta)}{d(\alpha - \delta(\alpha)) - d(-\delta(\alpha))}\right]\right\} \quad (5)$$

and $d(\cdot)$ denotes a distortion measure and $\delta(\alpha)$ is the optimal reconstruction point.

The main difference between the distribution from equation (2) and the Laplacian source in FIG. 2 is the existence of the delta function $\delta(z)$ and the scaling of the two terms in (2) with AR coefficient $\rho$. Due to the difference, the UTQ in FIG. 2 with equations (4) and (5) is not the optimal entropy-constrained quantizer for equation (2) (except for the case where $\rho=0$).

In accordance with this invention, the optimal ECSQ for the distribution of equation (2) has been successfully derived. Specifically, the optimal ECSQ is still a simple UTQ, but with a deadzone size given by:

$$\Gamma(\alpha, t^*) = 2\left(\frac{1}{1-\rho^2} e^{t^*} - 1\right) \quad (6)$$

Note that for $\rho=0$, equation (6) is reduced to equation (4).

Figure 3:
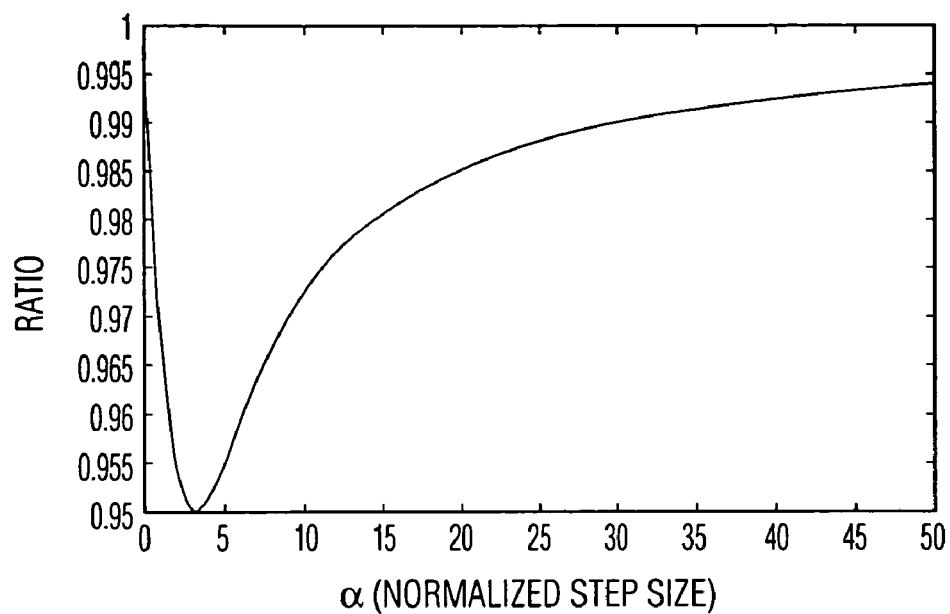
FIG. 3 depicts a graph showing an optimal deadzone scaling factor for a Laplacian distribution.

For the Laplacian source, the optimal deadzone-scaling factor for square-error distortion measure is illustrated in FIG. 3. In this case, the ratio between the optimal zero bin size t* and $\alpha-\delta(\alpha)$ is always less than or equal to 1 and approaches 1 for both a low bit rate and a high bit rate.

Figure 4:
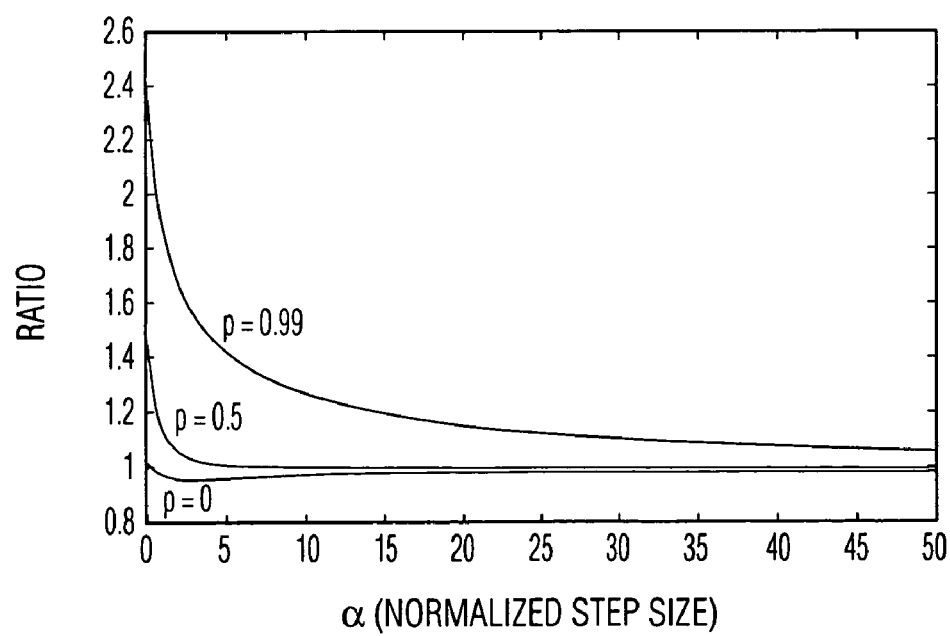
FIG. 4 depicts a graph showing an optimal deadzone scaling factor for a Markov-Laplace source.

However, as shown in FIG. 4, for the Markov-Laplace source in equation (2), the deadzone-scaling factor becomes larger as $\rho \to 1$ and greater than unity. Therefore, the optimal ECSQ should be the UTQ with a wider deadzone than required for the Laplacian source. Furthermore, since the optimal ECSQ is UTQ, it can be easily implemented using a simple look-up table and/or arithmetic operation with minimal complexity. More specifically, the optimal deadzone size t* can be pre-computed and stored as a look-up table using formula (6) for different values of quantizer step size α, which is then used at the quantizer and dequantizer. Namely, equations (5) and (6) can be combined to solve for t* in terms of α.

$$2\left(\frac{1}{1-\rho^2}e^{t^*} - 1\right) = (e^\alpha - 1)\exp\left\{-\alpha\left[\frac{d(\alpha - \delta(\alpha)) - d(t^*)}{d(\alpha - \delta(\alpha)) - d(-\delta(\alpha))}\right]\right\}$$

It is understood that while this exemplary embodiment is described in context of a video application, the ECSQ design can be applied to any application utilizing a Laplace-Markov source model. For example, the ECSQ can be used to quantize audio signals since the distribution of the audio signals usually follows Laplace-Markov source.

It is also understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A scalable video coding system in which the evolution of discrete cosine transform (DCT) coefficients is modeled as a Laplace-Markov process, the system comprising:
   a base layer processing system for generating a base layer reconstruction;
   an enhancement layer processing system for generating an enhancement layer reconstruction; and
   an entropy constrained scalar quantizer (ECSQ) system derived from a formula tailored to the Laplace-Markov model of DCT coefficients.

2. The scalable video coding system of claim 1, wherein the ECSQ system utilizes an ECSQ that comprises a uniform threshold quantizer with a deadzone size defined by the equation:

$$\Gamma(\alpha, t^*) = 2\left(\frac{1}{1-\rho^2}e^{t^*} - 1\right),$$

where t* denotes the optimal deadzone size; ρ is a value between −1 and 1, and α is a step size, and where $$\Gamma(\alpha, \beta) = (e^\alpha - 1)\exp\left\{-\alpha\left[\frac{d(\alpha - \delta(\alpha)) - d(-\beta)}{d(\alpha - \delta(\alpha)) - d(-\delta(\alpha))}\right]\right\}.$$

3. The scalable video coding system of claim 2, wherein the ECSQ is implemented as a look-up table.

4. The scalable video coding system of claim 2, wherein the ECSQ is implemented as a mathematical formula.

5. The scalable video coding system of claim 1, wherein the ECSQ system descritizes a prediction residual between an input frame and an estimation theoretic (ET) prediction output.

6. A program product stored on a recordable medium for use in a scalable encoder in which the evolution of discrete cosine transform (DCT) coefficients is modeled as a Laplace-Markov process, the program product comprising:
   means for generating a base layer reconstruction;
   means for generating an enhancement layer reconstruction; and
   quantizer means derived from a formula tailored to the Laplace-Markov model of DCT coefficients.

7. The program product of claim 6, wherein the quantizer means utilizes an entropy constrained scalar quantizer (ECSQ) that comprises a uniform threshold quantizer with a deadzone size defined by the equation:

$$\Gamma(\alpha, t^*) = 2\left(\frac{1}{1-\rho^2}e^{t^*} - 1\right),$$

where t* denotes the optimal deadzone size; ρ is a value between −1 and 1, and α is a step size, and where $$\Gamma(\alpha, \beta) = (e^\alpha - 1)\exp\left\{-\alpha\left[\frac{d(\alpha - \delta(\alpha)) - d(-\beta)}{d(\alpha - \delta(\alpha)) - d(-\delta(\alpha))}\right]\right\}.$$

8. The program product of claim 7, wherein values for t* are pre-computed and stored in a look-up table.

9. The program product of claim 7, wherein the ECSQ is implemented as a mathematical formula.

10. The program product of claim 6, wherein quantizer means descritizes a prediction residual between an input frame and an estimation theoretic (ET) prediction output.

11. A scalable encoding method in which the evolution of discrete cosine transform (DCT) coefficients is modeled as a Laplace-Markov process, the method comprising:
    generating a base layer reconstruction;
    generating an enhancement layer reconstruction; and
    descritizing a prediction residual between an input frame and an estimation theoretic (ET) prediction output with an entropy constrained scalar quantizer (ECSQ) derived from an explicit formula tailored to the Laplace-Markov model of DCT coefficients.

12. The method of claim 11, wherein the ECSQ comprises a uniform threshold quantizer with a deadzone size defined by the equation:

$$\Gamma(\alpha, t^*) = 2\left(\frac{1}{1-\rho^2}e^{t^*} - 1\right),$$

where t* denotes the optimal deadzone size; $\rho$ is a value between −1 and 1, and $\alpha$ is a step size, and where $$\Gamma(\alpha, \beta) = (e^\alpha - 1)\exp\left\{-\alpha\left[\frac{d(\alpha - \delta(\alpha)) - d(-\beta)}{d(\alpha - \delta(\alpha)) - d(-\delta(\alpha))}\right]\right\}.$$

13. The method of claim 12, comprising the further step of precomputing a plurality of values for the deadzone size.

\* \* \* \* \*